United States Patent [19]

Geisel

[11] 4,078,478

[45] Mar. 14, 1978

[54] ROTISSERIE DEVICE

[76] Inventor: Anthony Geisel, 5219 N. Spaulding, Chicago, Ill. 60625

[21] Appl. No.: 716,272

[22] Filed: Aug. 20, 1976

[51] Int. Cl.² ............................................. A47J 37/04
[52] U.S. Cl. ................................ 99/421 P; 99/421 H
[58] Field of Search ............ 99/421 P, 421 R, 421 H, 99/421 HH, 421 HV, 419–420, 339, 340, 443

[56] References Cited

U.S. PATENT DOCUMENTS

| Re. 23,662 | 5/1953 | Larkin | 99/421 H |
|---|---|---|---|
| 652,660 | 6/1900 | Bradlee | 99/421 H |
| 1,568,535 | 1/1926 | Schey | 99/421 H |
| 2,198,134 | 4/1940 | Spiegl | 99/421 HV X |
| 2,710,575 | 6/1955 | Overman | 99/421 H |
| 3,196,776 | 7/1965 | Norton | 99/421 P |
| 3,782,268 | 1/1974 | Navarro | 99/421 P |

*Primary Examiner*—Harvey C. Hornsby
*Assistant Examiner*—Arthur O. Henderson
*Attorney, Agent, or Firm*—Neuman, Williams, Anderson & Olson

[57] ABSTRACT

A rotisserie device is provided for use in barbecuing various food items, such as cuts of meat or the like. The device includes an elongated skeletal frame assembly which is mounted so as to rotate about its longitudinal axis over burning coals, electric heating elements or the like. The frame assembly embodies a pair of axially spaced end members which have corresponding peripheral portions thereof interconnected by elongated spacer elements. The elements are symmetrically arranged about the rotary axis and each element is provided with a plurality of longitudinally spaced openings. Sets of skewers are provided with the leading or pointed ends of the skewers of a set being disposed within the openings of a spacer element. The opposite or trailing ends of the skewers of a set are disposed in close proximity to an adjacent spacer element and are supportingly engaged by an elongated retainer rod having opposite ends thereof removably supported by the end members. The skewers of a set are disposed in spaced substantially parallel relation and extend in direction transversely of the rotary axis of the frame assembly.

8 Claims, 7 Drawing Figures

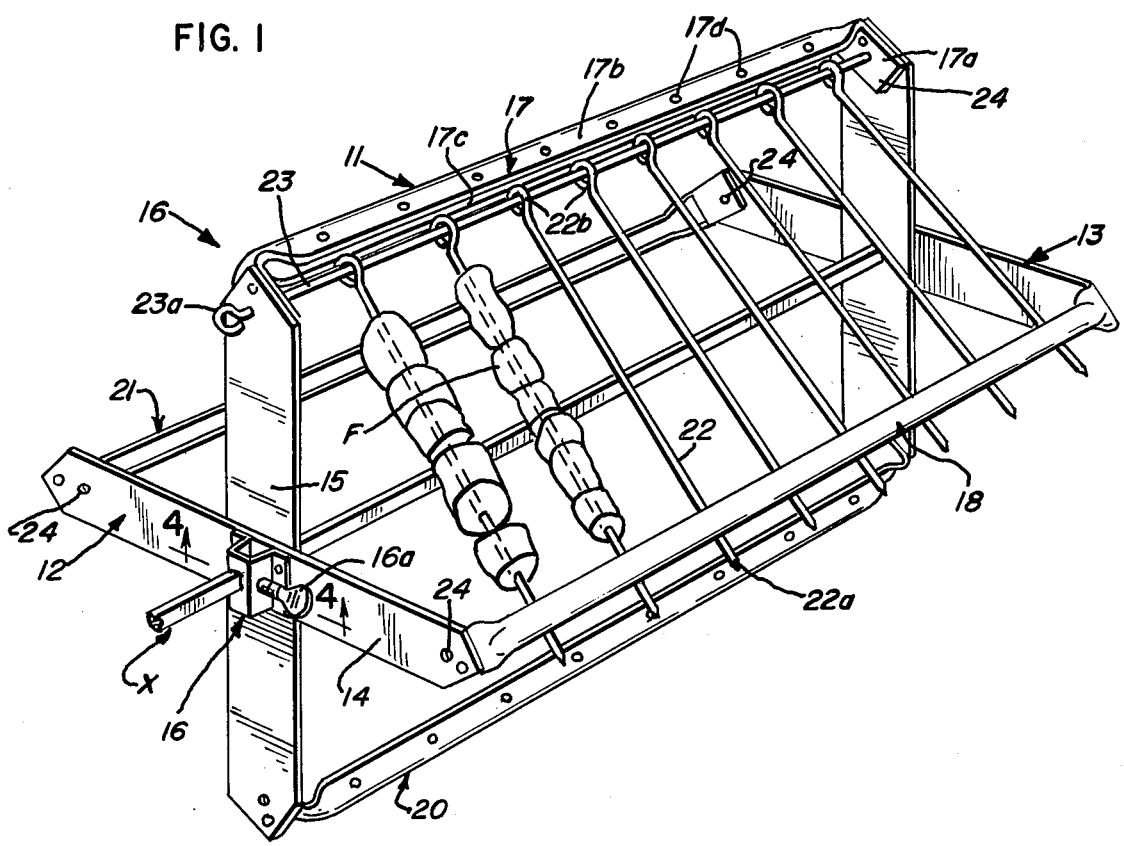
FIG. 1
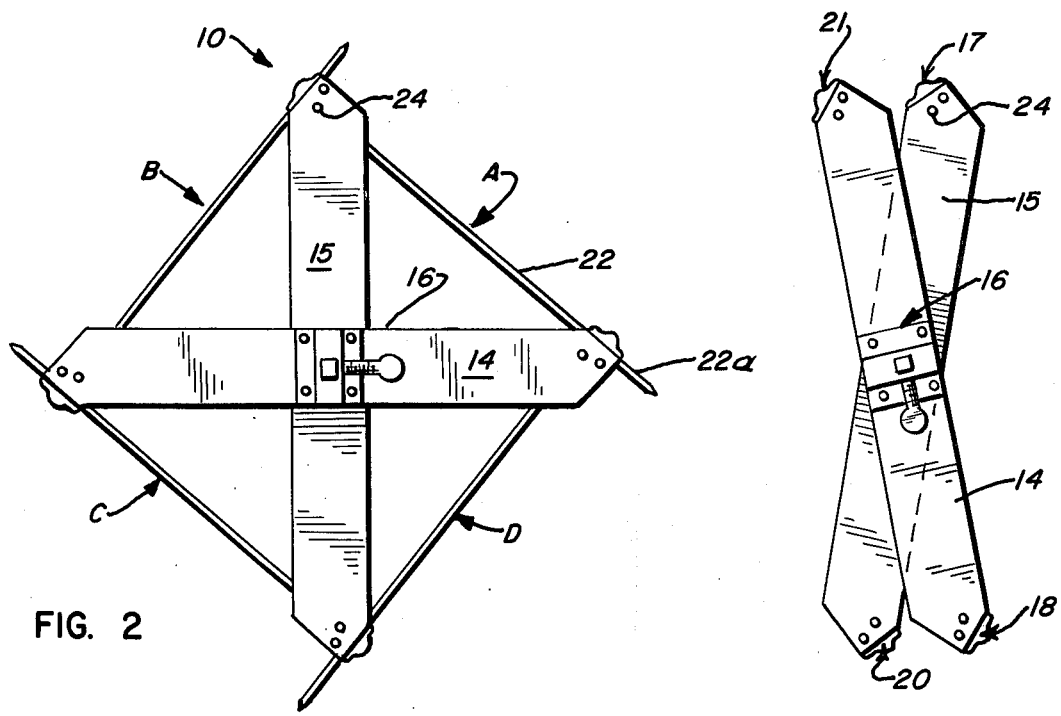
FIG. 2
FIG. 2A

FIG. 3
FIG. 5
FIG. 6
FIG. 4
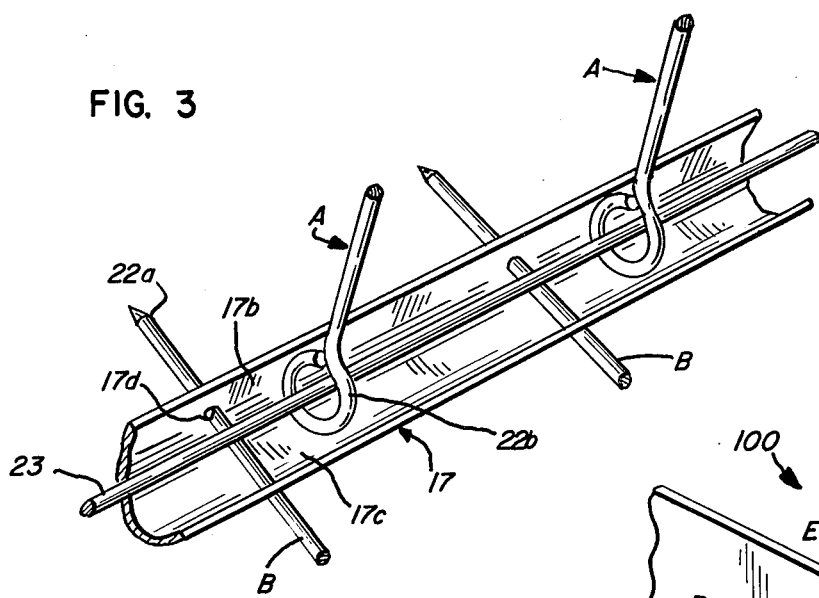
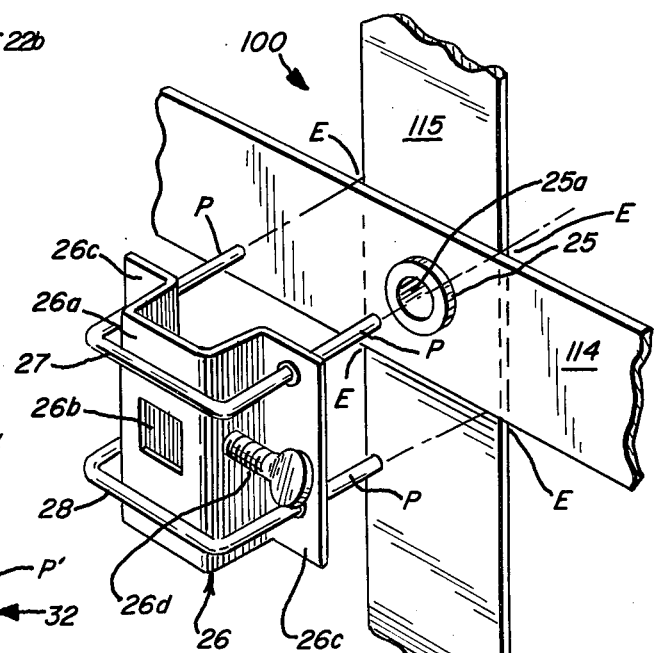
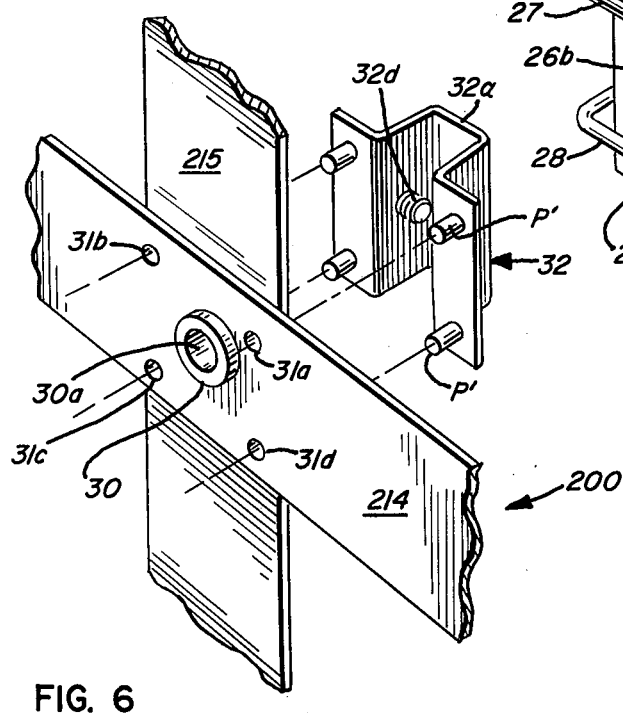
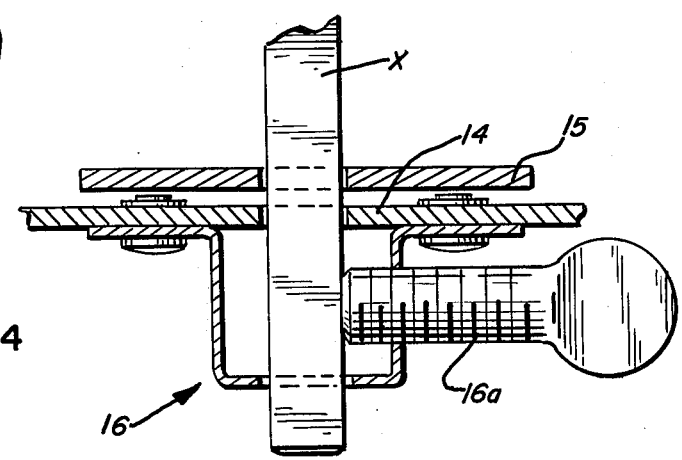

ROTISSERIE DEVICE

BACKGROUND OF THE INVENTION

Various rotisserie devices have heretofore been provided, however, because of certain design characteristics they are beset with one or more of the following shortcomings: (a) they are of costly, complex construction, (b) they are bulky, heavy and incapable of being readily disassembled for cleaning or storage, and (c) they are incapable of accommodating varying amounts and types of food items.

SUMMARY OF THE INVENTION

Thus, it is an object of the invention to provide an improved rotisserie device which is not beset with the aforenoted shortcomings.

It is a further object of the invention to provide an improved rotisserie device wherein individual skewers may be readily assembled on or disassembled from a frame assembly without requiring substantial disassembly of the device.

It is a further object of the invention to provide an improved rotisserie device which is capable of being utilized with a variety of heat sources and avoids the possibility of the food items impaled on the skewers from accidentally sliding off the skewers while the frame assembly is rotating.

It is a further object of the invention to provide an improved rotisserie device wherein the food items impaled on an individual skewer are disposed at varying distances from the heat source.

Further and additional objects will appear from the description, accompanying drawings and appended claims.

In accordance with one embodiment of the invention a rotisserie device is provided which includes an elongated skeletal frame assembly mounted for rotation about its longitudinal axis. The frame assembly embodies a pair of axially spaced end members having corresponding peripheral portions thereof interconnected by a plurality of elongated spacer elements symmetrically arranged about the rotary axis. Each spacer element is provided with a plurality of longitudinally spaced openings. Sets of skewers are provided with the leading ends thereof being removably accommodated within the openings of a given spacer element. The trailing ends of the skewers of a set are disposed in close proximity to an adjacent spacer element and are retained in such positions by an elongated retainer rod removably mounted on the end members. The retainer rod spans the distance between end members and interlocking engages the trailing end of each skewer of the set.

DESCRIPTION

For a more complete understanding of the invention reference should be made to the drawings wherein:

FIG. 1 is a fragmentary perspective end view of one form of the improved rotisserie device showing only one set of skewers mounted on the frame assembly and with only certain skewers loaded with food items.

FIG. 2 is an end elevational view of the device of FIG. 1. but with all sets of skewers mounted on the frame assembly.

FIG. 2A is an end elevational view of the frame assembly per se shown in a collapsed state ready for storage.

FIG. 3 is an enlarged fragmentary perspective view of one spacer element and showing the leading ends of one set of skewers extending through openings formed in the spacer element, and the trailing ends of a second set of skewers engaged by a retainer rod.

FIG. 4 is an enlarged fragmentary sectional view taken along line 4—4 of FIG. 1.

FIGS. 5 and 6 are fragmentary perspective views of modified forms of the improved rotisserie device and showing two types of mounting brackets and end members in disassembled relation.

Referring now to the drawings and more particularly to FIG. 1, one form of the improved rotisserie device 10 is shown which is particularly suitable for use in barbecuing various food items F, such as cuts of meat or the like, over burning coals, electric heating coils or similar means. Device 10, as shown in FIG. 1 includes a frame assembly 11 having a substantial skeletal configuration, and sets of skewers A, B, C and D which are removably mounted on the frame assembly. The frame assembly 11 is mounted on a horizontally disposed drive shaft X having the ends thereof supported by suitable upright bearing members, not shown. One shaft end is connected to a conventional drive motor, not shown, which causes the device 10 to rotate at a given speed about the horizontal shaft X as an axis.

In the illustrated embodiment, the frame assembly 11 includes a pair of axially spaced end members 12, 13 which are preferably of like configuration and thus, only member 12 will hereinafter be discussed in detail. Member 12 is provided with a pair of elongated sections 14, 15 of like construction, which have the midportions thereof disposed in face-to-face relation. When the device is in operative condition, FIG. 1, the sections are disposed in substantially perpendicular relation. The midportion of each section is provided with a central opening through which a segment of shaft X extends. In the FIG. 1 embodiment, the exposed surface of the midportion of section 12 has a bracket 16 affixed thereto which enables the section 12 to be clamped onto the shaft X. A similar bracket, not shown, may be utilized for end member 13. The clamping action on the shaft is obtained by a conventional tightening screw 16a carried by the bracket.

The end members 12, 13 are maintained in proper axially spaced relation by a plurality of symmetrically arranged elongated spacer elements 17, 18, 20 and 21, all of which are of like configuration. Each spacer element interconnects corresponding distal ends of the sections comprising the end members 12, 13. As seen in FIG. 3 wherein only one spacer element 17 is shown, it is substantially channel-shaped thereby giving the element strength and inflexibility. As seen in FIG. 1, the ends 17a of the spacer element 17 are offset and riveted or otherwise affixed to the ends of the corresponding end member sections. While only spacer element 17 is being described in detail, the same structural details prevail in the other spacer elements as well. The portion of the spacer element disposed intermediate the end members 12, 13 has the angularly extending flanges 17b, 17c thereof, which form the channel shape, provided with a plurality longitudinally spaced openings 17d. The openings in the flanges are equally spaced from one another and corresponding openings in the flanges are transversely aligned relative to the longitudinal axis of the spacer element. The function of the openings will be discussed more fully hereinafter. The transverse alignment of the corresponding opening is also substantially aligned with an adjacent spacer element. For example, as seen in FIG. 1, the transverse alignment of the openings in element 17 is substantially aligned with element 21; those of element 21 with element 20, etc.

Each set A, B, C, D of skewers preferably comprises a like number of skewers 22 which are of the same configuration. Each skewer has a pointed leading end 22a which is adapted to readily pierce the food item F to be impaled on the skewer. The opposite or trailing end 22b of the skewer is formed into a loop, see FIG. 3. Once the food item has been impaled on the skewer 22, the leading end 22a thereof is inserted through a pair of transversely aligned openings formed in the flanges of a spacer element. The looped end 22b of the skewer is then positioned so that it is in proximity to an adjacent spacer element. The looped end of the skewer is retained in relatively fixed position by an elongated retainer rod 23 which is removably mounted on corresponding portions of the end members 12, 13. One retainer rod is provided for each set of skewers and is adapted to simultaneously engage the looped ends of the skewers of the set.

In certain instances, only one retainer rod may be required for all sets of skewers. Three of the sets of skewers would each have the pointed ends thereof inserted through the looped ends of the next adjacent set of skewers. In this arrangement the looped ends of the sets, except for one, would be disposed between the flanges 17b and c of the spacer element and aligned with corresponding openings 17d formed in the flanges. The looped ends of the one remaining set will be engaged by the retainer rod as seen in FIG. 3.

Each retainer rod 23 has the opposite ends thereof accommodated within aligned openings 24 formed in corresponding portions of the end members 12, 13. One end 23a of rod 23 may be enlarged and thus prevent the end from accidentally becoming disengaged from the adjacent opening 24 in the end member. The opposite end of the rod 23, after being threaded through the looped ends of the skewers of a set and extending through the opening 24 in the opposite end member, may be grasped by a suitable clip or the like not shown. Thus, once the retainer rod 23 is in proper assembled relation with the end members, the skewers 22 of a set are prevented from becoming acccidentally disengaged from the frame assembly. To remove the individual skewers from the frame assembly 11, merely requires the clip to be disengaged from the end of rod 23 and then manually pulling the opposite end 23a of the rod in an axial direction until it disengages the looped end 22b of the selected skewer. The disengaged end 22b of the selected skewer is then moved laterally a slight amount so as to clear the adjacent spacer element whereupon the selected skewer is manually moved endwise until the opposite end 22a is free from the opening in the spacer element. If the remaining skewers of the set are to remain assembled on the frame assembly 11, the end of the retainer rod 23 is once again, if necessary, inserted through the looped ends of the remaining skewers of the set before being inserted through the aligned opening 24 in the end member and the clip once again assembled on the end of the rod.

In a modified form of the rotisserie device 100, shown in FIG. 5, the sections 114, 115 comprising each end member are pivotally connected to one another at their midportions by a grommet 25. The grommet is provided with a center opening 25a through which the drive shaft X extends. When the device 100 is in its operative condition; that is to say, the sections are disposed at a right angle to one another, an adaptor piece 26 is utilized to retain the sections in such a relative position. The adaptor piece includes a channel-shaped base 26a having an opening 26b formed therein which is adapted to be aligned with the grommet opening 25a. The sides 26c of the base 26a are offset laterally in opposite directions and are adapted to engage the exposed surface of section 114 when the adaptor piece is assembled on the drive shaft and the end member.

In addition to the base 26a, adaptor piece 26 is provided with four symmetrically arranged prongs P which extend transversely in the same direction from the sides 26c of the base 26a. The prongs are adapted to be positioned at the four corners E formed between the adjacent side edges of the intersecting sections 114, 115. As seen in FIG. 5 the upper prongs are interconnected by a bail section 27 and in a similar manner the lower prongs are interconnected by a bail section 28.

FIG. 6 discloses a second modification 200 of the rotisserie device wherein the end member sections 214, 215 thereof are pivotally interconnected at their midportions by a grommet 30, which is like grommet 25 and is provided with a central opening 30a through which the drive shaft X extends. The midportion of each section 214, 215 is provided with four symmetrically arranged apertures 31a, 31b, 31c and 31d. When the sections 214, 215 are in proper angular relation whereby the frame assembly is in operative condition, the corresponding apertures 31a, b, c and d formed in the sections are in alignment with one another. When the sections are in such a relation an adaptor piece 32, similar to piece 26, is assembled thereon whereby the prongs P' thereof will extend through the corresponding aligned apertures. As in the case of piece 26, a base 32a is provided in piece 32 having an opening formed therein which is aligned with the grommet opening 30a and is adapted to accommodate the drive shaft X. Both adaptor pieces 26 and 32 incorporate a conventional lock screw 26d, 32d for securing the adaptor piece in a fixed position on the shaft X. In the modified structures 100, 200, an adaptor piece is provided for each end member of the frame assembly.

When the rotisserie device 100, 200 is to be rendered inoperative and collapsed for storage, the sets of skewers, the retainer rods, and the adaptor pieces are disassembled from the frame assembly, whereupon the end members and the associated spacer elements are pivoted about the grommets so as to assume a folded position.

Because of the skeletal configuration of the frame assembly in all forms of the improved rotisserie device 10, 100 and 200, the total weight of the device is significantly reduced without sacrificing the strength, durability and stability of the device. Furthermore, because of the openness of the device, the heat rays produced during cooking, more uniformly and effectively surround the food items impaled on the skewers. The size and shape of the various components comprising the improved devices may be varied from that shown and described without departing from the scope of the claimed invention.

I claim:

1. A rotisserie device comprising an elongated skeletal frame assembly mounted for rotation about a central longitudinal axis; a plurality of elongated skewers segregated into a predetermined number of sets, each skewer of a set having a leading end, a trailing end, and a product-accommodating center portion, the skewers of each set being removably mounted on said frame assembly and arranged in axially spaced relation relative to said central axis and being radially spaced from said central axis; and retainer means for retaining said skewers on said frame assembly; said frame assembly including a pair of axially spaced end members, and a plurality of elongated, symmetrically arranged, spacer elements interconnecting corresponding peripheral portions of said end members, each element being provided with a plurality of longitudinally spaced apertures removably accommodating only the leading ends of each of said skewers, the trailing ends of each of said skewers being disposed in proximity to an adjacent spacer element and being engaged only by said retainer means, the latter being removably carried by and spanning the distance between said end members; the center portion of each skewer of a set being spaced from said spacer elements and said end members during assembly and disassembly of the skewer with respect to said frame assembly.

2. The rotisserie device of claim 1 wherein each end member includes a plurality of radially extending arms, the distal ends of corresponding arms of said end members being interconnected by a spacer element, the inner ends of the arms of an end member forming a hub.

3. The rotisserie device of claim 2 wherein the hub of each end member includes a bracket through which a drive shaft is adapted to extend.

4. The rotisserie device of claim 2 wherein the radially extending arms of each end member are retained in a predetermined relative position by a removable bracket having portions thereof fixedly engaging said arms, said bracket having an axially disposed opening through which a drive shaft is adapted to extend.

5. The rotisserie device of claim 4 wherein the radially extending arms of each end member are pivotally movable relative to one another about the central longitudinal axis so as to assume an inoperative collapsed position when said bracket is disengaged from said arms.

6. A rotisserie device comprising an elongated skeletal frame assembly mounted for rotation about a central longitudinal axis, said frame assembly including a pair of axially spaced end members and a plurality of elongated symmetrically arranged spacer elements interconnecting corresponding peripheral portions of said end members, each spacer element being provided with a plurality of longitudinally spaced apertures; a plurality of elongated skewers segregated into a predetermined number of sets, the skewers of each set being removably mounted on said frame assembly and arranged in axially spaced relation relative to the rotary axis of said frame assembly; and retainer means for retaining said skewers on said frame assembly and being provided with an elongated shank having the opposite ends thereof removably accommodated by corresponding portions of said end members; the leading ends of each of said skewers being removably accommodated in the longitudinally spaced apertures of one spacer element and the trailing ends of each of skewers being provided with an opening, said trailing ends being disposed in proximity to an adjacent spacer element and the elongated shank of said retainer means extending through the openings of the trailing ends of each of said skewers.

7. The rotisserie device of claim 6 wherein the longitudinal axes of said spacer elements, and the shanks of said retainer means are in spaced substantially parallel relation with the rotary axis of said skeletal frame assembly.

8. The rotisserie device of claim 7 wherein the skewers of a set are disposed in spaced substantially parallel relation with respect to one another and are disposed substantially transversely of the rotary axis of said frame assembly.

* * * * *